(12) United States Patent
Brazell et al.

(10) Patent No.: US 6,948,412 B2
(45) Date of Patent: Sep. 27, 2005

(54) MOTOR DRIVEN WOOD WORKING TOOL WITH VACUUM FEATURE

(75) Inventors: Kenneth M. Brazell, Piedmont, SC (US); Robert G. Everts, Camp Verde, AZ (US)

(73) Assignee: One World Technologies Ltd. (BM)

( * ) Notice: Subject to any disclaimer, the term of this patent is extended or adjusted under 35 U.S.C. 154(b) by 144 days.

(21) Appl. No.: 10/455,287

(22) Filed: Jun. 5, 2003

(65) Prior Publication Data

US 2004/0248507 A1 Dec. 9, 2004

(51) Int. Cl.⁷ .................................................. B26D 7/06
(52) U.S. Cl. ........................ 83/100; 83/788; 144/252.2
(58) Field of Search ................ 83/100, 788; 144/252.1, 144/252; 416/60; 451/451, 456

(56) References Cited

U.S. PATENT DOCUMENTS

| | | | |
|---|---|---|---|
| 1,218,301 A | * 3/1917 | Nesbitt | 269/59 |
| 1,496,035 A | 6/1924 | Thomson | |
| 1,789,569 A | 1/1931 | Tannewitz | |
| 3,669,163 A | 6/1972 | Crane | |
| 4,491,047 A | * 1/1985 | Butkiewicz et al. | 83/817 |
| 6,679,145 B1 | * 1/2004 | Lee | 83/100 |
| 6,837,134 B2 | * 1/2005 | Chin-Chin | 83/100 |

* cited by examiner

Primary Examiner—Timothy V. Eley
(74) Attorney, Agent, or Firm—Brinks Hofer Gilson & Lione; G. Peter Nichols (57) ABSTRACT

A motor driven power tool is provided having an internal dust collection system. A single electric motor drives the working member such as a saw or sander and simultaneously drives an air pump which acts as a collector vacuum for debris created when the power tool is in use. A dust collector shroud surrounds a portion of the cutting member and forms an outlet connected to the air pump inlet.

20 Claims, 6 Drawing Sheets

MOTOR DRIVEN WOOD WORKING TOOL WITH VACUUM FEATURE

BACKGROUND OF THE INVENTION

1. Field of the Invention

The present invention relates to motorized saws having a built in dust collection feature.

2. Background Art

Motorized saws, particularly band saws and table saws used to cut wood, can create a large quantity of fine dust. The dust generated cannot only cause problems with operation of the saw, but, fine airborne sawdust can cause eye and respiratory problems for the operator unless good goggles and a face mask is worn. Furthermore, the sawdust generated creates mess requiring a fair amount of operator time to clean up the sawdust after the wood has been cut.

To address the sawdust problem, many stationary saws are equipped with attachments for connecting a remote collector vacuum to the saw to collect air and sawdust in the region of the saw adjacent the cutting zone. Saws having a dust collection connector require the operator to connect the band saw to a centralized vacuum system or to a stand alone cannister vacuum using a conduit and the necessary adapters. When using the saw to cut soft wood, the operator must remember to turn on both the saw and the dust collection vacuum before cutting. Canister vacuums are typically quite noisy. The noise of the canister vacuum coupled with the noise of the saw frequently requires an operator to wear ear protection if the saw is going to be operated for a significant length of time.

Prior art saws in the past have attempted to build in dust collection systems into band saws or table saws, however, those efforts have been relatively ineffective and in some instances, severely limit the operator's access to the saw blade for service or adjustment.

SUMMARY OF THE INVENTION

Accordingly, the motorized saw of the present invention is designed to efficiently collect a very high percentage of the sawdust generated and discharge the sawdust into a debris collection bag or a remote dust collection system. The band saw of the present invention further incorporates the dust collection system including a fan driven by the same motor which drives the saw blade.

The band saw of the present invention includes a pair of spaced apart wheels mounted on a frame about which a flexible saw blade is supported. A motor drives one of the wheels so that the saw blade is driven about the wheels in an endless loop with the blade forming a straight segment spanning between the wheels, providing a cutting zone for cutting a workpiece. The first and second housings generally enclose the wheels. A baffle extends between the first and second housing surrounding one of the wheels, defining a fan chamber. A plurality of fan blades are associated with the wheel, which in cooperation with the fan chamber forms a centrifugal fan. The fan chamber is provided with an axial input adjacent the wheel axis and an outlet adjacent the chamber periphery. A conduit is mounted to the second housing portion, the conduit has one end connected to the air inlet and an opposite end forming an air intake positioned adjacent to a section of the saw blade downstream of the cutting zone so that air and entrained sawdust is drawn into the conduit intake, passed through the fan chamber and discharged via the chamber outlet.

The first and second housing portions further define a partially enclosed debris collection region extending about the saw blade in a region downstream of the cutting zone, the debris collection region is in communication with the conduit intake so that substantially all of the sawdust or debris generated from cutting a workpiece can be efficiently collected. Preferably, the baffle is affixed to the second housing portion which is removable as an assembly from the first housing portion to provide free access to the saw blade for service. In the illustrated embodiment, the baffle is integral with the second housing portion and is formed of molded plastic.

The present invention is an adapter for use with circular table saws. A rotary air pump is provided having a rotary fan and a housing with an air inlet and an air outlet. A single motor drives the rotary pump and the circular saw blade. The rotary pump inlet collects air and entrained sawdust when the saw is used which is discharged into a remote dust collector.

An alternative embodiment invention utilizes a single electric motor to operate a bench top sander having a planar table and a sanding member projecting therefrom and a rotary air pump mounted below the table having an air inlet connected to a dust collector shroud and an air outlet for discharging air and entrained dust in a remote dust collector.

Preferably, the dust collection region is substantially isolated from the fan chamber with the exception of the air flow path provided by the conduit.

DETAILED DESCRIPTION OF THE PREFERRED EMBODIMENT(S)

Figure 1:
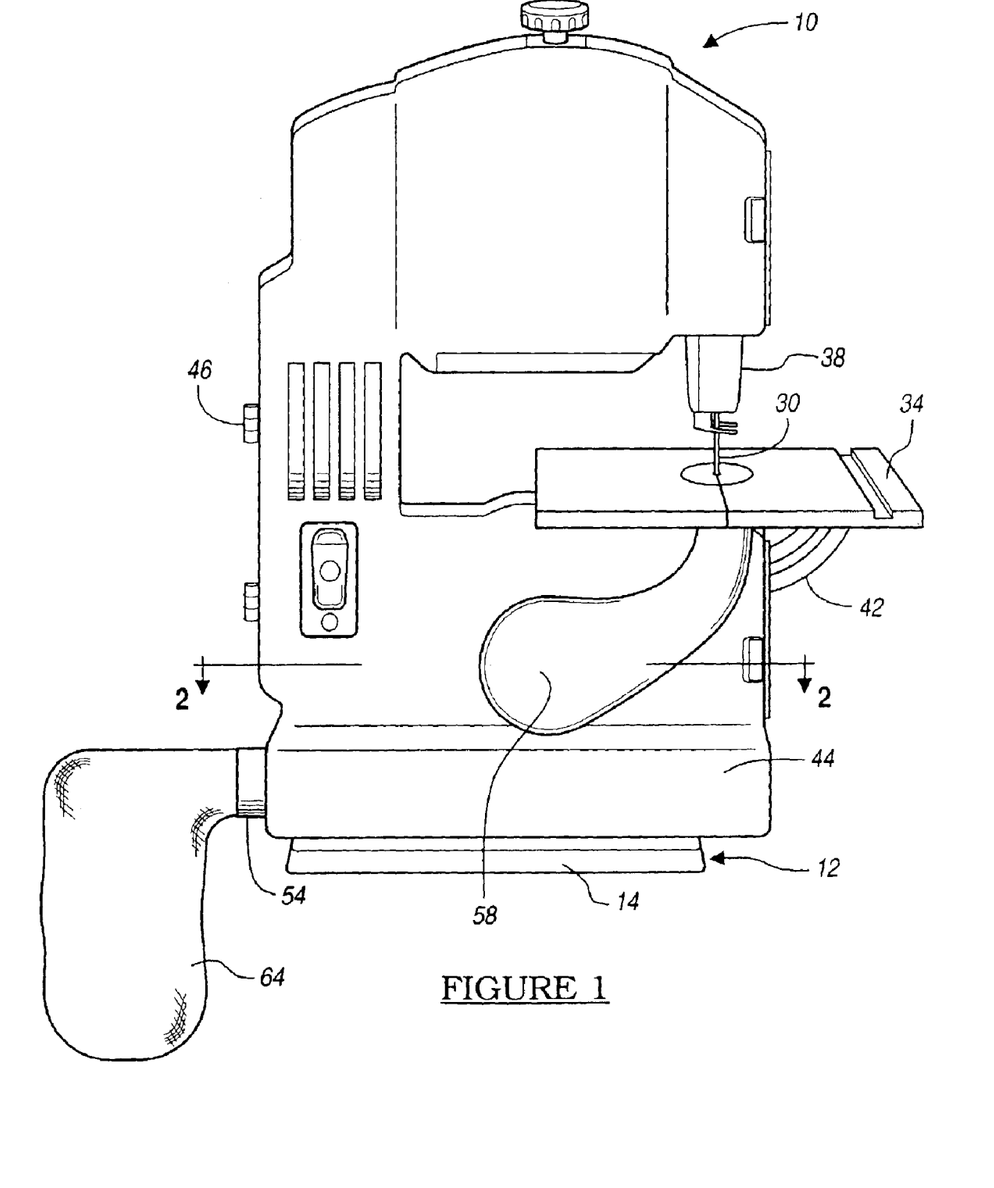
FIG. 1 is a perspective side view of a band saw of the present invention.

A band saw 10 illustrating the preferred embodiment of the present invention is illustrated in FIG. 1 and described in more detail with reference to FIGS. 2–5. Band saw 10 illustrates a representative example of a small bench top band saw employing the present invention. Band saws of all different sizes can utilize the present invention from bench top band saws having wheel diameters in the 8" to 10" range all the way up to large commercial band saws having wheel diameters which are 18" or larger. Additionally, while illustrated using a two-wheel band saw, the present invention is equally useful on band saws having three or more wheels about which the saw blade is mounted.

Figure 4:
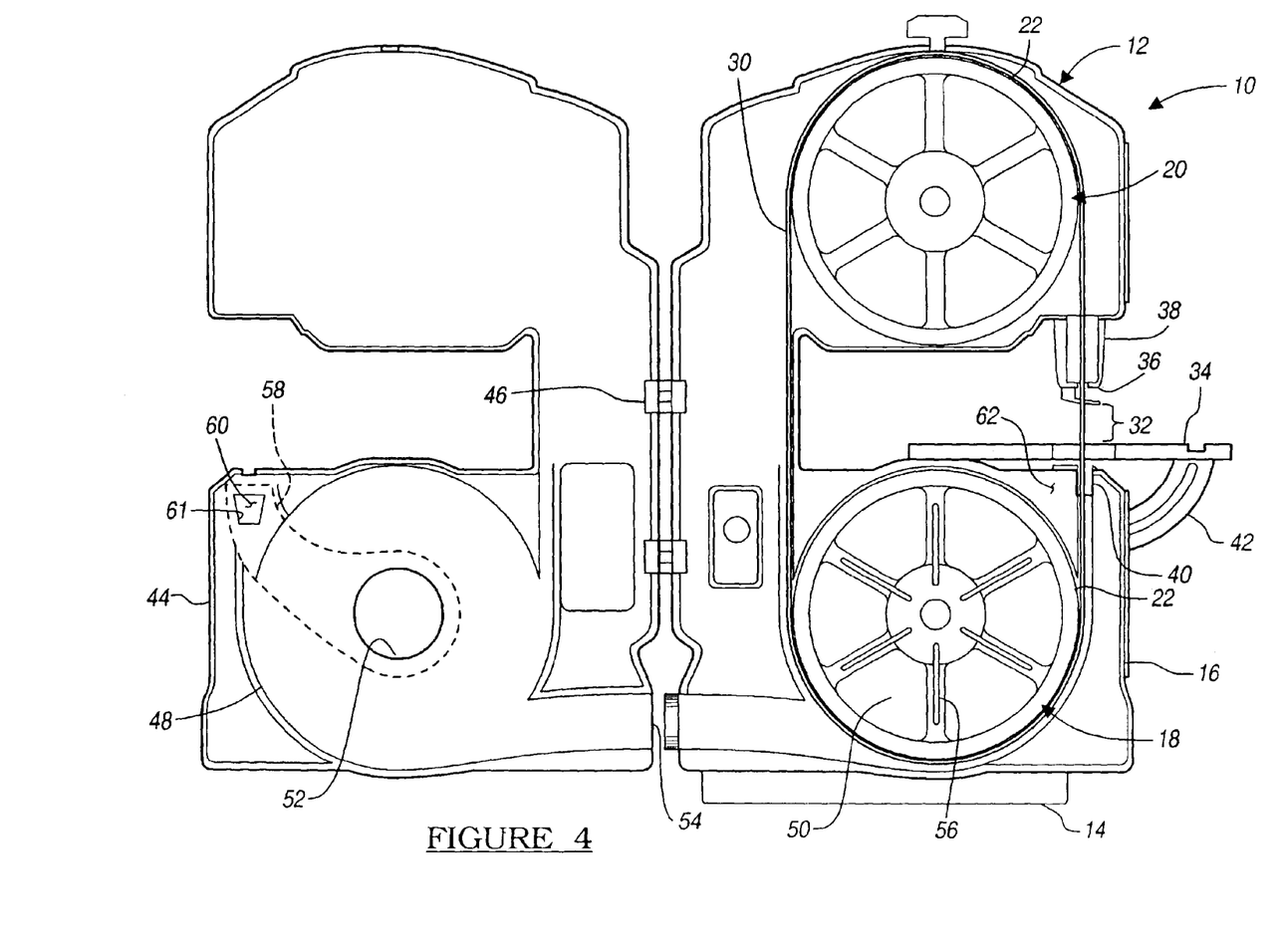
FIG. 4 is a side view of the band saw with the second housing portion hinged open to expose the band saw internal mechanisms.

Band saw 10 is provided with a generally C-shaped frame 12 which terminates in a base 14 adapted to be mounted upon a table surface. The C-shaped frame is best illustrated in FIG. 4. The C-shaped frame can be unitary and formed of a metal casting such as aluminum die casting or the like, formed of a structural fiber reinforced plastic. Alternatively, the C-shaped frame can be fabricated from a plurality of steel or cast iron components which are bolted together as typically done in larger floor mounted band saws.

Figure 2:
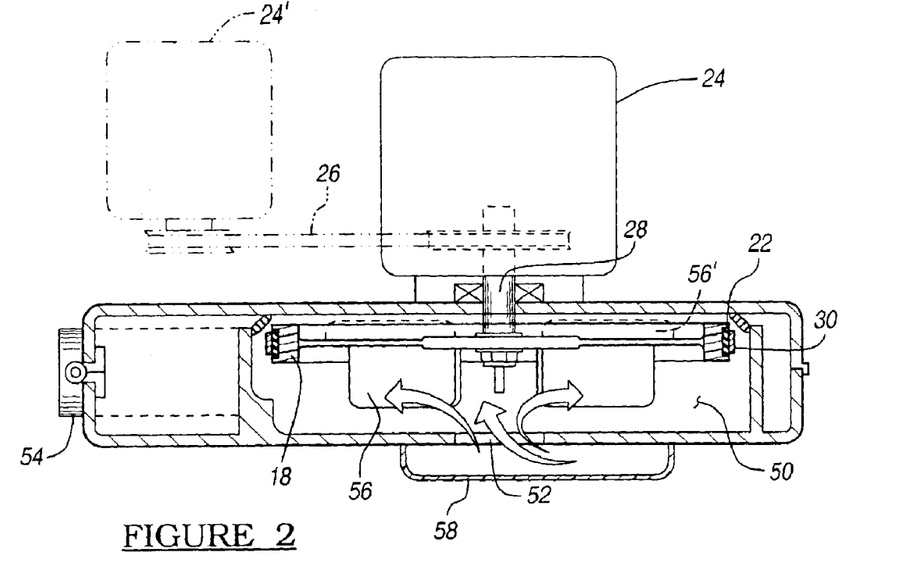
FIG. 2 is a cross-sectional view taken along line 2—2 of FIG. 1.
Figure 3:
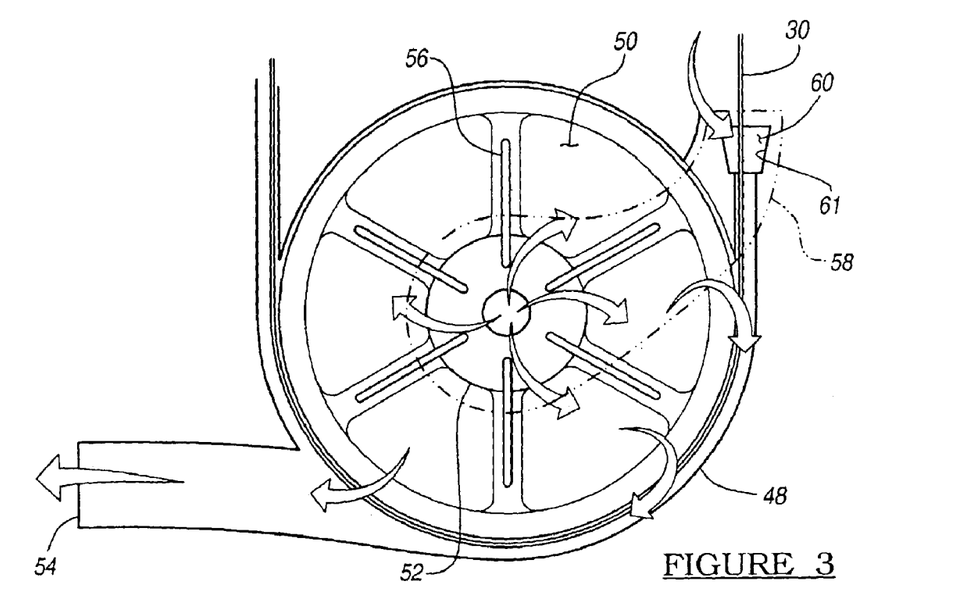
FIG. 3 is a simple schematic view of the fan and fan chamber.

In the embodiment illustrated, frame 12 has integrally formed thereto a first housing portion 16. Alternatively, first housing portion can be a discrete component such as a sheet metal or plastic panel which is bolted to the structural frame 12. Mounted to frame 12 are first and second spaced apart wheels 18 and 20. The first and second wheels 18 and 20 are spaced apart and pivotally mounted to frame 12 for rotation about a pair of generally parallel axes. The outer peripheral edge of each of the first and second wheels is preferably provided with a slightly crowned synthetic rubber tire 22 in a conventional manner. A motor 24, illustrated in FIG. 2, is mounted to frame 12 and operatively drives first wheel 18. In the illustrated embodiment where the band saw wheel diameter is relatively small, i.e. in the 8" to 10" diameter range, motor 24 may directly drive first wheel 18. In larger saws where the wheel diameter is greater, a motor 24' is located spaced apart from the axis of the first wheel and connected thereto by a pulley or cog belt 26, to drive the wheel with a drive ratio to achieve the desired peripheral wheel speed for the material to be cut. First wheel 18 is directly mounted to shaft 28 which is pivotally supported upon frame 12 by suitable bearings. In direct drive saws, shaft 28 may be an extension of the motor armature shaft while in larger saws, wheel support shaft 28 will be journaled to frame 12 independent of motor 24'.

A flexible saw blade 30 forms an endless loop which extends about first and second wheels 18 and 20. The saw blade contacts the tires 22 on each of the wheels 18 and 20 along an arcuate portion of their outer periphery. The saw blade in a two wheel saw forms a generally oval path with straight blade segments extending between the two arcuate portions wrapped about the perimeter of the wheel.

Of course the present invention can be utilized in horizontal band saws or hinged band saws such as those used as cut-off saws. Reference to lower and upper wheels for description purposes is not intended to limit the scope of the invention. Regardless of whether the band saw has two or three wheels, the saw blade will form at least one straight segment which spans between the two wheels. The straight segment includes a cutting zone 32 for cutting a workpiece placed therein and advanced relative to the moving saw blade. The saw blade in the cutting zone 32 moves in a downstream direction toward the adjacent wheel carrying debris such as sawdust away from the cut formed in the workpiece.

In the band saw 10 illustrated, drive motor 24 drives first wheel 18 causing the saw blade to advance about its oval path moving in an endless loop about the first and second wheels 18 and 20. The saw blade in the cutting zone 32 is moving downward in the illustrated embodiment from upper second wheel 20 downstream to lower first wheel 18. Table 34 is positioned immediately below the cutting zone 32 to provide a surface upon which a workpiece can be supported. Table 34 has a central aperture through which the saw blade 30 extends in a conventional manner. The saw blade is supported relative to the table by an upper blade guide 36 mounted on the distal end of vertically adjustable column 38 which is movably affixed to frame 12 in a conventional manner. A lower blade guide assembly 40 is located below table 34 between the cutting zone 32 and the end of the straight blade segment. Table 34, as illustrated, is supported relative to frame 12 by an arcuate mounting block 42 to enable the inclination of the table to be varied relative to the blade.

A removable second housing portion 44 is removably attachable to frame 12 and is oriented on the opposite side of first wheel 18 and first housing portion 16. In the illustrated embodiment, both the first and second housing portions 16 and 44 surround both the first and second wheels 18 and 20, however, each of the first or second housing portions 16 or 44 may be made up of separate upper and lower parts cooperating with the first and second wheels 18 and 20 as is typical in large saws. Second housing portion 44 is connected to frame 12 by a pair of hinges 46 as illustrated. The second housing portion 44 is retained in the closed position by a latch or detent and may be hinged to the open position illustrated in FIG. 4 to provide free and easy access to the saw blade 30 and lower blade guide assembly 40. A baffle 48 is provided on at least one of the first and second housing portions 16 and 44 to generally surround the first wheel 18 and extend between the first and second housing portions 16 and 44.

In the embodiment illustrated, baffle 48 is provided on second housing portion 44. Baffle 48 generally extends about the entire periphery of first wheel 18 to define fan chamber 50 therebetween. Baffle 48 is interrupted in two places to provide clearance for the saw blade 30 to pass therethrough. Second housing portion 44 is provided with an inlet opening 52 which is generally aligned with the axis of the first wheel 18. Baffle 48 extending between the first and second housing portions 16 and 44, further defines an outlet 54 which extends from an outer peripheral region of fan chamber 50. Preferably, outlet 54 extends generally tangentially from fan chamber 50 as illustrated. For optimal performance, fan chamber 50 may be volute shaped with the radial distance between the baffle 48 and wheel axis being greatest in the region where the chamber outlet 54 diverges from the fan chamber 50 periphery.

First wheel 18 is provided with a series of radially extending fan blades 56. Fan blades 56 can be integrally formed into the spokes of the first wheel 18 or fabricated separately from plastic or sheet metal and attached using conventional fasteners. Fan blades 56 are generally straight and radial in the embodiment illustrated, however, curved fan blades can alternatively be used as is well known in the blower field. Further, fan blades 56, 56' may be installed on both sides of the first wheel 18 as shown in phantom outline, to further increase air flow. When the saw is in use, the rotating fan blades 56 within the fan chamber 50 form a centrifugal pump expelling air out of outlet 54 and drawing air into fan chamber inlet 52. A conduit 58 is mounted to the second housing portion 44 defining an air passage connected at one end to the fan chamber inlet 52 and terminating at its opposite end in an air intake 60. Air intake 60 may be formed by an aperture 61 in the second housing 44 as illustrated where the conduit 58 may simply extend above the upper edge of the second housing 44' to form an intake which is generally adjacent to a section of the saw blade 30, which is between the cutting zone 32 and the periphery of first wheel 18.

Figure 5:
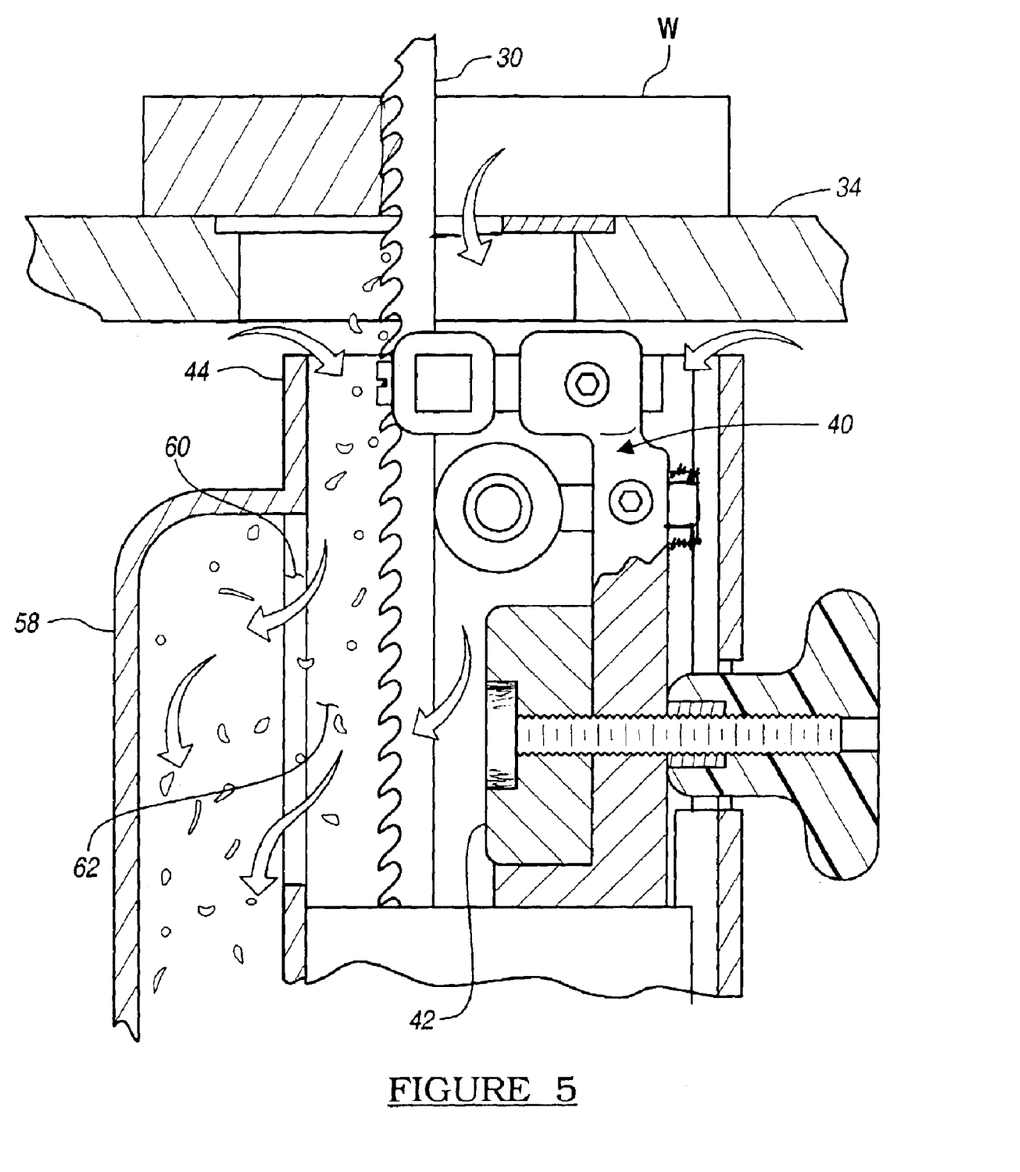
FIG. 5 is an enlarged end view of the dust collection region surrounding the lower blade guides.

This is best illustrated in FIG. 5, where the first and second housing portion 16 and 44 define a generally enclosed debris collection region 62 which extends about the saw blade and the lower blade guide assembly 40. The debris collection region 62 is substantially isolated from fan chamber 50 as it is desirable to remove all of the dust and debris from the saw blade so that sawdust does not become impacted between the band saw blade 30 and the outer periphery of rubber tire 22. Further, isolating the debris collection region 62 from the fan chamber 50 forces all of the collected sawdust to be discharged through the chamber outlet 54 where it can be collected in a dust collection bag 64 or the like or passed on to a remote collective vacuum.

Conduit 58 is preferably formed from an elongate member of C-shaped cross-section, as illustrated in FIGS. 1, 2 and 5, mounted on the exterior surface of the second housing portion 44 to define an elongate passage extending between intake 60 and chamber inlet 52. Preferably, conduit 58 is formed of a simple plastic molding which can be adhered to the outer surface of second housing portion 44 in a conventional manner. Second housing portion 44 may likewise be formed of plastic using an injection molding process. When the second housing portion 44 is formed in plastic, baffle 48 can be integrally formed within the second housing portion 44.

Utilizing the present invention, a dust collection feature can be added to a band saw with relatively little additional cost relative to the very significant functional benefits. By incorporating the fan blades 56 into the first wheel 18, relatively low fan rotational speeds are achieved. Therefore, fan noise is significantly reduced compared to a traditional canister type collector vacuum. The present invention is capable of discharging air with sufficient force that a very fine fabric bag can be simply attached to the fan chamber outlet 54 for dust collection purposes without any additional motors or blowers.

Figure 6:
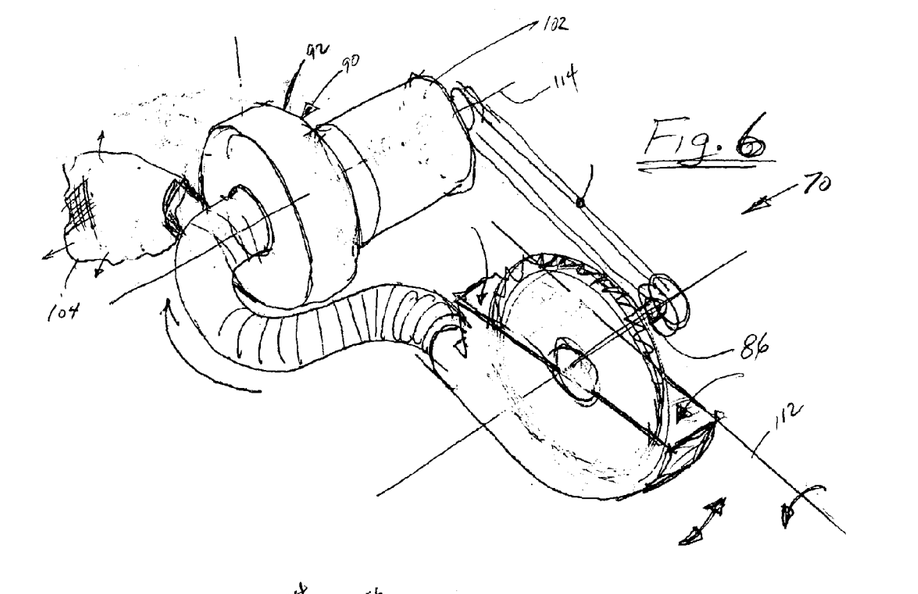
FIG. 6 is a simplified perspective view of the drive mechanism for a table saw employing the present invention.
Figure 7:
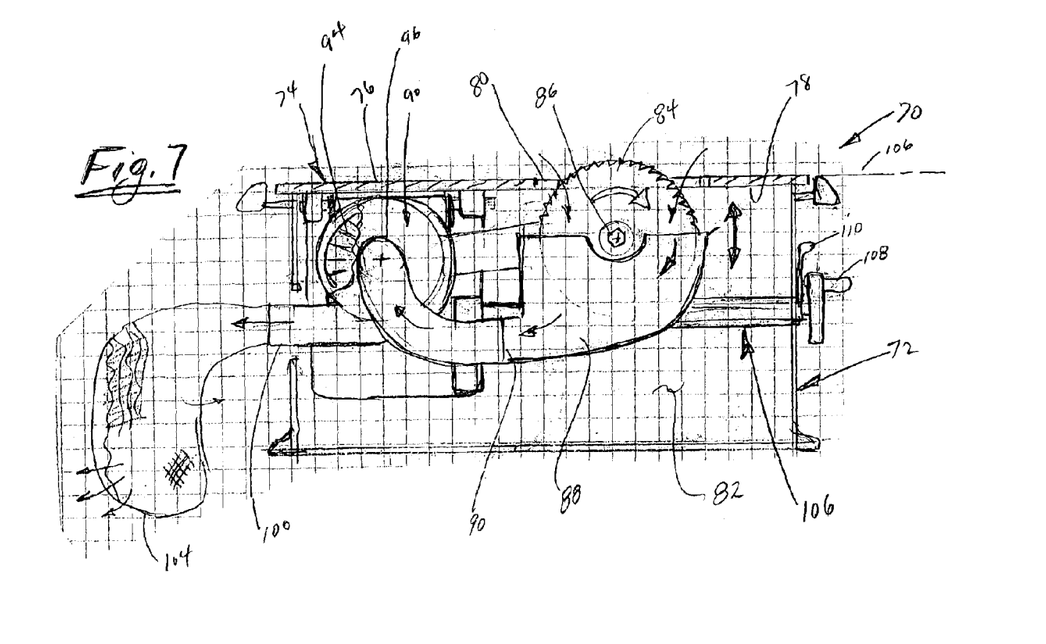
FIG. 7 is a more detailed cross-sectional side elevational view of the table saw embodiment of FIG. 6.

FIGS. 6 and 7 illustrate a table saw 70 employing the present invention. Table saw 70 includes a housing 72 having a generally planar table top 74 of generally conventional configuration. Table top 74 has a generally planar upper surface 76 and a corresponding lower surface 78. An opening 80 is formed through table top 74 extending between upper surface 76 and lower surface 78. Housing 72 further defines a generally enclosed cavity 82 generally below planar table top 74.

A rotary circular saw blade 84 is affixed to a rotary spindle 86 in a conventional manner. A chordal segment of saw blade 84 projects through opening 80 to extend above the planar upper surface 76 so that a user can cut a workpiece positioned on the table. The height of the chordal segment of the blade projecting above the table and the tilt angle of the blade may be varied relative to the table in a conventional manner. A shroud 88 extends about a lower portion of the saw blade which is oriented within generally enclosed cavity 82. Shroud 88 covers approximately the lower most half of the saw blade does not interfere with blade height adjustment. Shroud 88 forms a sawdust outlet 90 which is coupled to the rotary air pump 92. Rotary air pump 92 has an internal rotating band 94 which is mounted within a housing 96. Housing 96 defines an axial air inlet 98 and a generally tangential air outlet 100. When the band 94 is rotated, air is drawn into the inlet and discharged through outlet 100. Outlet 90 of shroud 88 is coupled to the axial air inlet so that when saw motor 102 is activated by the operator, the motor rotatably drives both the spindle 86 and attached circular saw 84 as well as the rotary fan 94 in rotary air pump 92. Accordingly, whenever the saw is turned on and operated, a high percentage of the sawdust generated will be collected within the dust collector shroud 88, passed through the air pump and discharged through air outlet 100. Outlet 100 can be connected to a conventional fabric dust collector bag 104 or a conventional vacuum system.

In the preferred table saw embodiment 70 illustrated, motor 102 is double-ended having a pair of axially opposed output shafts. One output shaft drives the spindle 86 via a pair of pulleys and a belt in a conventional manner. The other output shaft operatively drives fan 94 and rotary air pump 92.

Table saw 70 is provided with a conventional blade height and tilt adjustment mechanism 106 having a hand wheel 108 and a mode lever 110 oriented on the front of vertical face of housing 72 as illustrated in FIG. 7. When the mode lever is moved to a first position, rotation of hand wheel 108 causes the saw blade and associated spindle to move up and down during the blade height. When the mode lever is moved to the opposite position, rotation of hand wheel 108 causes the motor, the rotary air pump and the rotary spindle and attached circular saw blade to pivot as an assembly about a tilt axis which is approximate the intersection of the plane of the circular saw blade and upper surface of the table top. The assembly is capable of being tilted in at least one direction relative to the saw blade when oriented perpendicular to the table top. In the embodiment illustrated, the motor and air pump are oriented generally to the left of the saw blade when the saw blade is viewed from the front of the housing allowing the blade to rotate counterclockwise to the left about tilt axis 112 illustrated in FIG. 6. When the blade height is adjusted, the assembly generally rotates about the motor fan axis 114 in a conventional manner.

Figure 8:
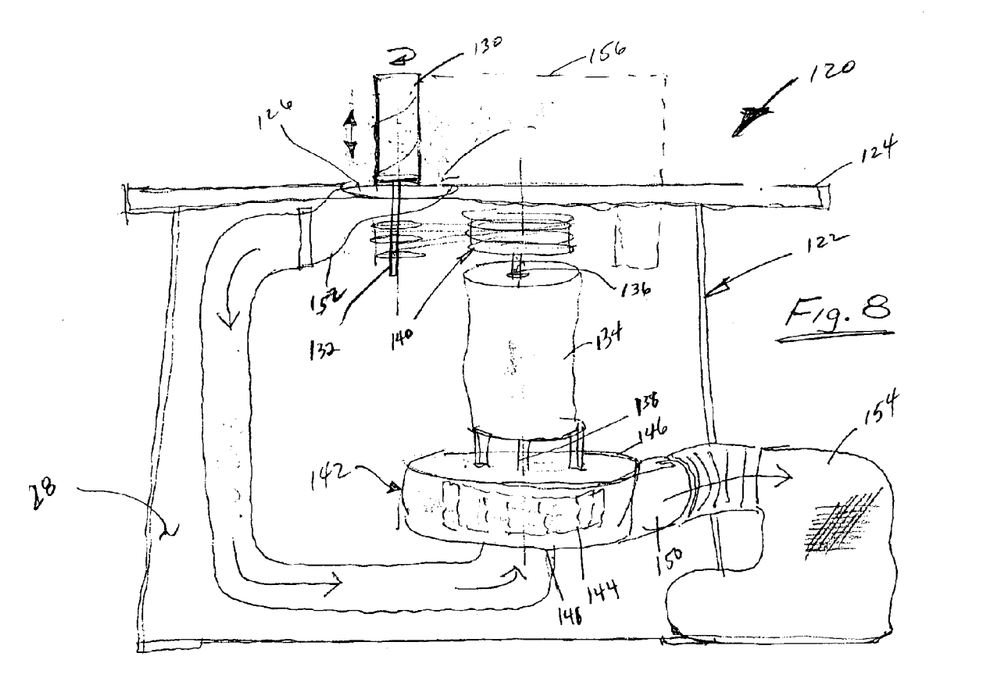
FIG. 8 is a side elevational view of a bench top sander embodiment of the present invention.

FIG. 8 illustrates a sander 120 employing the present invention. The sander illustrated is an oscillating spindle table sander. The sander 120 has a housing 122 having a planar table top 124 with an opening 126 formed therein and extended between the planar upper surface, the table top 124 and an enclosed cavity 128 oriented generally beneath the table top 124. A sanding member 130, which in the embodiment illustrated, is a cylindrical drum cover sandpaper is driven by a rotary spindle 132 which is mounted relative to the underside of the planar table top 124 allowing the sanding member to extend through opening 126 and rotate relative to table 124. A motor 134 is provided with enclosed cavity 128 having a pair of axially opposed output shafts 136 and 138. Output shaft 136 is operatively connected to spindle 132 to rotate the spindle about the spindle axis. An oscillatory drive mechanism 140 connects the motor and spindle causing the spindle to simultaneously axially oscillate at a relatively low frequency relative to the spindle speed. Any one of a number of conventional oscillatory mechanisms can be utilized to interconnect the shaft 136 and spindle 132 such as the oscillatory mechanism shown in U.S. Pat. No. 5,402,604 which is incorporated by reference herein. The lower output shaft 138 drives rotary air pump 142. Rotary air pump includes a rotary fan 144 optimally driven by motor shaft 138 and a housing 146 having an axial air inlet 148 and a generally tangential air outlet 150. A dust collector shroud 152 is oriented on the underside of the table and extends about the spindle 138 immediately below opening 126. The conduit connects dust collector shroud 152 to axial air inlet 148 of the air pump 142. Whenever the operator turns on the sander motor 134, the motor simultaneously drives spindle 32 and associated sanding member 130 as well as air pump 142. In this manner, whenever the sander is in use, the sanding dust generated is collected within the dust collector 152 entrained in the air being moved through air pump 142 and discharged into a remote dust collector such as porous bag 154 or other conventional dust collecting systems.

Sander 120 is illustrated as a conventional oscillating spindle sander having a cylindrical sanding member 130. Alternatively, the sander member can be an oscillating belt sander 156 as shown in phantom outline. In such a case, opening 126 and the dust collector shroud 152 will be elongated accordingly to correspond to the size and shape of the sanding member utilized.

Figure 9:
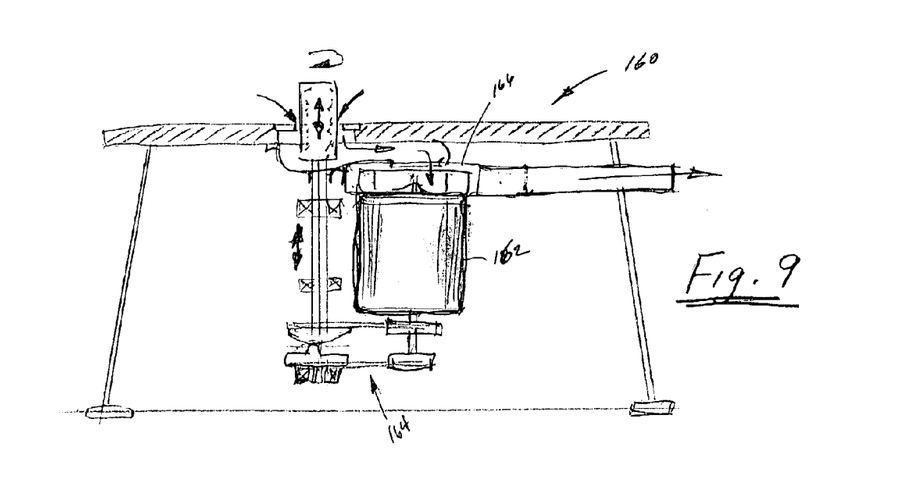
FIG. 9 is an alternative bench top sander embodiment.

FIG. 9 illustrates a variation on the oscillating spindle sander 120. In FIG. 9, the sander 160 is at the output end of motor 162. Motor 162 is similarly provided with a pair of axially opposed output shafts, however, in the sander 160, the spindle drive oscillation mechanism 164 is located on the lower end of the motor while the air pump 166 is located above the motor. This configuration is otherwise similar to sander 120 nor the distance between the sanding member and the inlet to the air pump is significantly reduced.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A band saw comprising:
   a frame;
   spaced apart first and second wheels pivotally mounted on the frame about spaced apart axes;
   a motor which drives at least one of the first and second wheels;
   a flexible saw blade forming a loop extending about the first and second wheels, the saw blade having a straight cutting segment in a region spanning between the wheels;
   a first and second housing portion attached to the frame and generally enclosing the first and second wheels, at least one of the first housing portions including a baffle which generally surrounds the outer periphery of the one of the first and second wheels located downstream of the saw blade cutting zone, the baffle and the first and second housing portions collectively defining a fan chamber substantially enclosing said wheel, the fan chamber having an inlet adjacent the enclosed wheel axis and an outlet extending from an outer peripheral region of the chamber;
   a centrifugal fan having a plurality of blades for rotation with the enclosed wheel to draw air into the chamber inlet and discharge air through the chamber outlet; and
   a conduit mounted to one of the first and second housing portions on a side of the enclosed wheel which is opposite a connection between the enclosed wheel and the motor, the conduit having an intake end oriented adjacent the section of the saw blade downstream of the saw blade cutting zone so that when the band saw is in use, the centrifugal fan causes air and entrained cutting debris generated when a workpiece is cut to be drawn into the conduit intake end, passed through the fan chamber and discharged through the chamber outlet.

2. The band saw of claim 1 further comprising a table mounted on the frame, the table having an aperture through which the straight segment of the saw blade passes, a generally planar support surface for a workpiece to be cut, the support surface oriented between the cutting zone of the saw blade and the first wheel.

3. The band saw of claim 1 wherein the first and second housing portions collectively define a partially enclosed debris collection region extending about the saw blade and in communication with the conduit intake.

4. The band saw of claim 1 further comprising a saw blade support guide mounted to the frame for positioning the saw blade, the blade support guide at least partially located adjacent to the conduit intake downstream of the saw blade cutting zone.

5. The band saw of claim 1 wherein the conduit intake is substantially isolated from the fan chamber.

6. The band saw of claim 1 wherein the second housing portion is connected to the first housing portion by a hinge.

7. The band saw of claim 1 wherein the conduit is formed by an elongate member of a C-shaped cross section which is affixed to an exterior surface of the second housing portion to define an elongate passage therebetween.

8. The band saw of claim 7 wherein the second housing portion is formed of plastic.

9. The band saw of claim 1 wherein at least a portion of the baffle is integrally formed with the second housing portion.

10. The band saw of claim 1 wherein the second housing portion is formed of plastic.

11. The band saw of claim 10 wherein at least a portion of the baffle is integrally formed with the second housing portion.

12. The band saw of claim 1 wherein the fan chamber outlet is generally tangential to the fan chamber.

13. A band saw comprising:
    a generally C-shaped frame;
    first and second spaced apart wheels pivotally supported by the frame for rotation about generally parallel axes;
    a motor coupled to and drivingly rotating one of the wheels;
    a flexible saw blade forming an endless loop extending about an arcuate portion of the outer periphery of each of the wheels forming a straight segment spanning between the wheels which includes a cutting zone for cutting a workpiece placed there against as the saw blade advances toward the first wheel from the second wheel creating debris which is moved with the saw blade toward the first wheel;
    a first housing portion fixed relative to the frame and oriented adjacent a first side of the first wheel;
    a second housing portion removably attached to the frame and oriented adjacent a second side of the first wheel, at least one of the first and second housing portions including a baffle which generally surrounds the outer periphery of the first wheel and substantially extending between the first and second housing portions to define a fan chamber having an outlet extending from an outer peripheral region of the chamber, the second housing portion having a fan chamber inlet opening extending therethrough adjacent the axis of the first wheel;
    a plurality of fan blades affixed to the first wheel and aligned relative thereto to pump air from the fan chamber inlet to the outlet; and
    a conduit attached to the second housing defining an air passage having an intake adjacent to a section of the saw blade between the cutting zone and the first wheel, and an output in communication with the fan chamber inlet so that debris formed as the workpiece is cut is entrained in air drawn into the conduit intake and transported through the conduit to the fan chamber inlet by the rotating fan blades to be discharged through the fan chamber outlet;
    wherein the second housing portion and attached conduit are removable providing free access to the saw blade and first wheel for service.

14. The band saw of claim 13 further comprising a table mounted on the frame, the table having an aperture through which a straight segment of the saw blade passes in a generally planar support surface for a workpiece to be cut, the support surface oriented between the cutting zone of the saw blade and the first wheel.

15. The band saw of claim 14 wherein the first and second housing portions collectively define a partially enclosed debris collection region extending about the saw blade and in communication with the conduit intake.

16. The band saw of claim 15 further comprising a saw blade support guide mounted to the frame for positioning the saw blade as it moves through the support guide, the support guide located substantially within the debris collection region.

17. The band saw of claim 15 wherein the debris collection region is substantially isolated from the fan chamber.

18. The band saw of claim 13 wherein the second housing portion is connected to the first housing portion by a hinge.

19. The band saw of claim 14 wherein the conduit is formed by an elongate member of a C-shaped cross section which is affixed to an exterior surface of the second housing portion to define an elongate passage therebetween.

20. The band saw of claim 14 further comprising a porous debris collection bag affixed to the chamber outlet for entrapping and collecting debris.

* * * * *